(12) United States Patent
Shurygin et al.

(10) Patent No.: US 11,250,196 B2
(45) Date of Patent: Feb. 15, 2022

(54) CONDUCTOR SUBDIVISION IN PHYSICAL INTEGRATED CIRCUIT LAYOUT FOR PARASITIC EXTRACTION

(71) Applicant: Siemens Industry Software Inc., Plano, TX (US)

(72) Inventors: Alexander Shurygin, Beaverton, OR (US); James Falbo, Tualatin, OR (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 16/119,906

(22) Filed: Aug. 31, 2018

(65) Prior Publication Data

US 2020/0074036 A1 Mar. 5, 2020

(51) Int. Cl.
*G06F 30/392* (2020.01)

(52) U.S. Cl.
CPC .................... *G06F 30/392* (2020.01)

(58) Field of Classification Search
CPC ...... G06F 30/39; G06F 30/392; G06F 30/398; G06F 2119/12
See application file for complete search history.

(56) References Cited

U.S. PATENT DOCUMENTS

| | | | | |
|---|---|---|---|---|
| 6,061,508 A * | 5/2000 | Mehrotra | ............ | G06F 17/5036 716/113 |
| 6,175,947 B1 * | 1/2001 | Ponnapalli | .......... | G06F 17/5036 716/115 |
| 6,330,704 B1 * | 12/2001 | Ljung | ..................... | G06F 30/23 716/115 |
| 7,669,152 B1 * | 2/2010 | Tcherniaev | ........... | G06F 30/367 716/136 |
| 9,779,193 B1 * | 10/2017 | Ginetti | ..................... | G06F 30/30 |
| 10,285,276 B1 * | 5/2019 | Kukai | .................... | G06F 30/392 |
| 2006/0265682 A1 * | 11/2006 | Fujimura | ............. | G03F 7/70125 716/54 |
| 2009/0172628 A1 * | 7/2009 | Chyan | .................. | G06F 17/5077 716/129 |
| 2009/0187866 A1 * | 7/2009 | Ou | ....................... | G06F 17/5009 716/136 |
| 2011/0078642 A1 * | 3/2011 | Elfadel | ............... | G06F 17/5036 716/106 |

* cited by examiner

*Primary Examiner* — Jack Chiang
*Assistant Examiner* — Aric Lin

(57) ABSTRACT

A computing system can perform a layout-to-schematic process on a geometric layout design of an integrated circuit, which can generate a device-level layout design for the integrated circuit. The computing system also can perform a parasitic extraction process on the geometric layout design by utilizing the device-level layout design for the integrated circuit. The computing system implementing the parasitic extraction process can sub-divide a conductor in the device-level layout design into multiple sub-divided conductor portions based on conversion rules corresponding to the physical properties of layers for the integrated circuit described in a technology file. The computing system can generate a physical layout design of the integrated circuit from the device-level layout design having the sub-divided conductor portions based on the technology file. The computing system can extract electrical representations of nets corresponding to the conductors in the physical layout design to form a netlist for the physical layout design.

20 Claims, 6 Drawing Sheets

CONDUCTOR SUBDIVISION IN PHYSICAL INTEGRATED CIRCUIT LAYOUT FOR PARASITIC EXTRACTION

TECHNICAL FIELD

This application is generally related to electronic design automation and, more specifically, to conductor subdivision in physical integrated circuit layout for parasitic extraction.

BACKGROUND

Electronic devices or systems, such as integrated circuits, can be used in a variety of products, from automobiles to microwaves to personal computers. Designing and fabricating integrated circuits typically involves many steps, known as a "design flow." The particular steps of a design flow often depend upon the type of integrated circuit being designed, its complexity, the design team, and the fabricator or foundry that will manufacture the integrated circuit. Typically, software and hardware "tools" verify the design at various stages of the design flow, and errors in the design can be corrected or the design can be otherwise improved.

Several steps are common to most design flows for integrated circuits. Initially, the specification for a new integrated circuit can be transformed into a logical design, sometimes referred to as a register transfer level (RTL) description of the circuit, or a schematic design. With this logical design, the integrated circuit can be described in terms of both the exchange of signals between hardware registers and the logical operations that can be performed on those signals. The logical design can employ a Hardware Design Language (HDL), such as the SystemVerilog or Very high speed integrated circuit Hardware Design Language (VHDL). The logic of the circuit can be analyzed to confirm that it will accurately perform the functions desired for the integrated circuit. This analysis is sometimes referred to as "functional verification."

After the accuracy of the logical design has been confirmed, the logical design can be converted into a device design by synthesis software. The device design, typically in the form of a netlist, describes the specific electronic devices, such as transistors, resistors, and capacitors, which can be used in the integrated circuit, along with their interconnections. This device design generally corresponds to the level of representation displayed in conventional circuit diagrams.

The device design can be transformed with a place-and-route process into a geometric "layout" design, which describes specific geometric elements. The geometric elements, typically in the form of polygons, define the shapes that can be created in various materials to manufacture the integrated circuit. Typically, a designer can select groups of geometric elements representing circuit device components, e.g., contacts, gates, or the like, and place them in a design area. These groups of geometric elements may be custom designed, selected from a library of previously-created designs, or some combination of both. Once the groups of geometric elements representing circuit device components have been placed, geometric elements representing connection lines can be placed between these geometric elements according to the predetermined route. These lines can form the wiring used to interconnect the integrated circuit.

Before the geometric layout design can be utilized to create a mask for use in a photolithographic manufacturing process that produces the integrated circuit, the geometric layout design can undergo a number of physical verification analyses. A layout-versus-schematic (LVS) tool can confirm that the geometric layout design accurately represents the device design. The LVS tool can generate a netlist based on the geometric layout design and compare this netlist against the device design, which can also be a netlist, to determine whether the geometric layout design conforms to the device design. To generate the netlist from the geometric layout design, the LVS tool can extract design devices, such as transistors, diodes, capacitors, resistors, or the like, and their associated connectivity, from the geometric layout design based on an LVS rule deck from a foundry that will manufacture the integrated circuit. The LVS tool can utilize the extracted devices and connectivity to generate a device-level layout design and then convert the device-level layout design into the netlist corresponding to the geometric layout design.

Another physical verification analysis can be parasitic extraction, where a parasitic extraction tool can analyze the geometric layout design to determine parasitic values, such as resistances, capacitances, inductances, or the like, and utilize the parasitic values to determine whether an integrated circuit manufactured according to the geometric layout design would include voltage drops, signal delay, or signal noise. The parasitic extraction tool can convert the device-level layout design generated by the LVS tool into a physical layout design representing the integrated circuit three-dimensionally based on an Interconnect Process Technology (IPT) file generated by the foundry, and then utilize the physical layout design to generate parasitic electrical models for nets in the physical layout design and write the parasitic electrical models to an extracted parasitic netlist. The extracted parasitic netlist can be utilized to identify voltage drops, signal delay, or signal noise that could be present in the integrated circuit manufactured using the geometric layout representation.

Conventionally, the LVS rule deck and the IPT file from the foundry describe the layers of the geometric layout design at a common level of abstraction, for example, describing the same layers with the same connectivity. For example, when the LVS rule deck describes a metal layer and its connectivity, the IPT file describes the metal layer as also having the same connectivity, so that the parasitic extraction tool can perform the parasitic extraction process. In some instances, the foundry may have additional process details, such as varied heights for different portions of a metal layer, which can be added to the IPT file. This additional detail can allow for more accurate extracted parasitic netlist to be generated during the parasitic extraction process, but if added to the LVS rule deck introduces time-consuming and resource intensive processing during the LVS process. Thus, in the generation of the LVS rule deck and the IPT file, foundries trade-off accuracy in the parasitic extraction process with speed and ease of processing in the LVS process.

SUMMARY

This application discloses a computing system to perform a layout-to-schematic (LVS) process on a geometric layout design of an integrated circuit. A portion of the LVS process includes the generation of a device-level layout design for the integrated circuit from the geometric layout design based on an LVS rule deck. The computing system also can perform a parasitic extraction process for the geometric layout design by utilizing the device-level layout design for the integrated circuit generated during the LVS process. The computing system implementing the parasitic extraction process can sub-divide a conductor in the device-level layout design into multiple sub-divided conductor portions based on conversion rules corresponding to the physical properties of layers for the integrated circuit described in a technology file. The computing system can generate a physical layout design of the integrated circuit from the device-level layout design having the sub-divided conductor portions based on the technology file. The computing system can extract electrical representations of nets corresponding to the conductors in the physical layout design to form a netlist for the physical layout design. Embodiments will be described in greater detail below.

DETAILED DESCRIPTION

Illustrative Operating Environment

Figure 1:
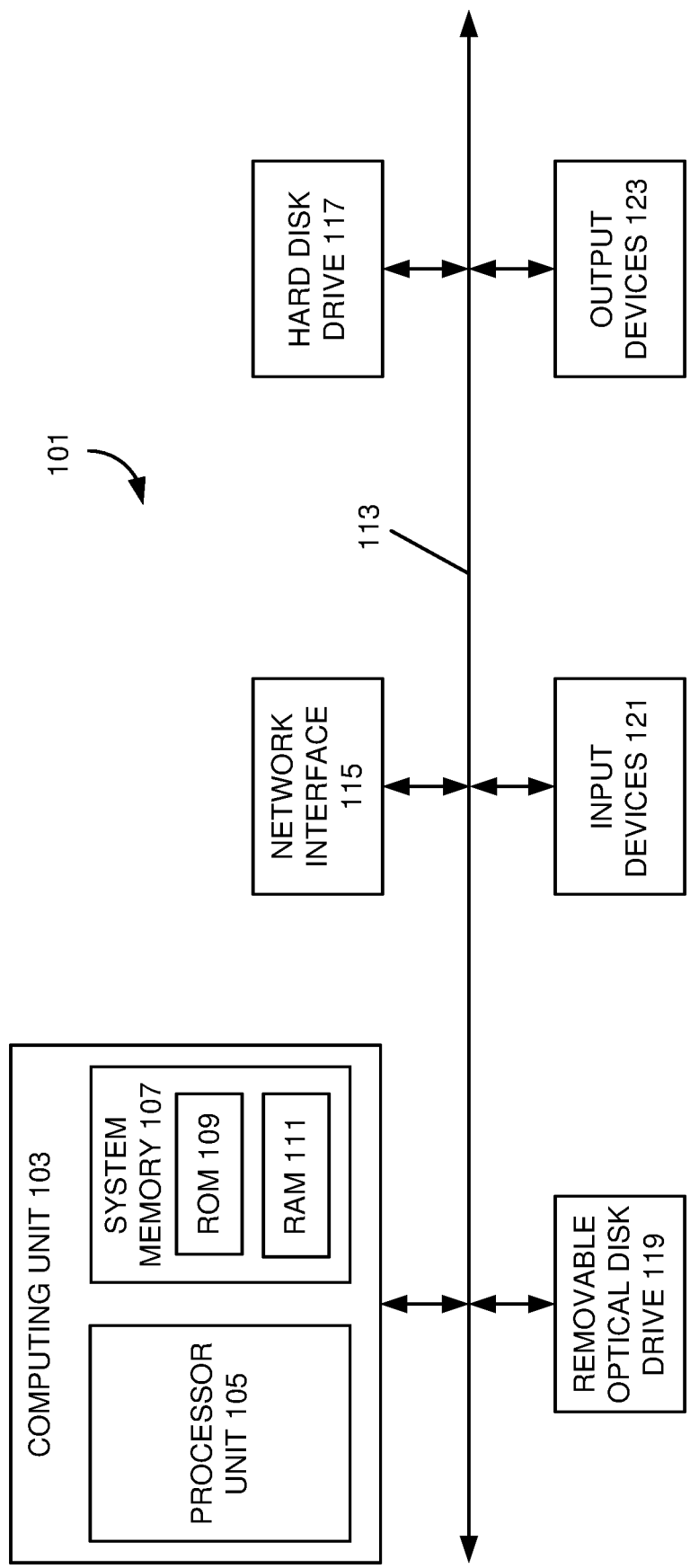
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 115-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
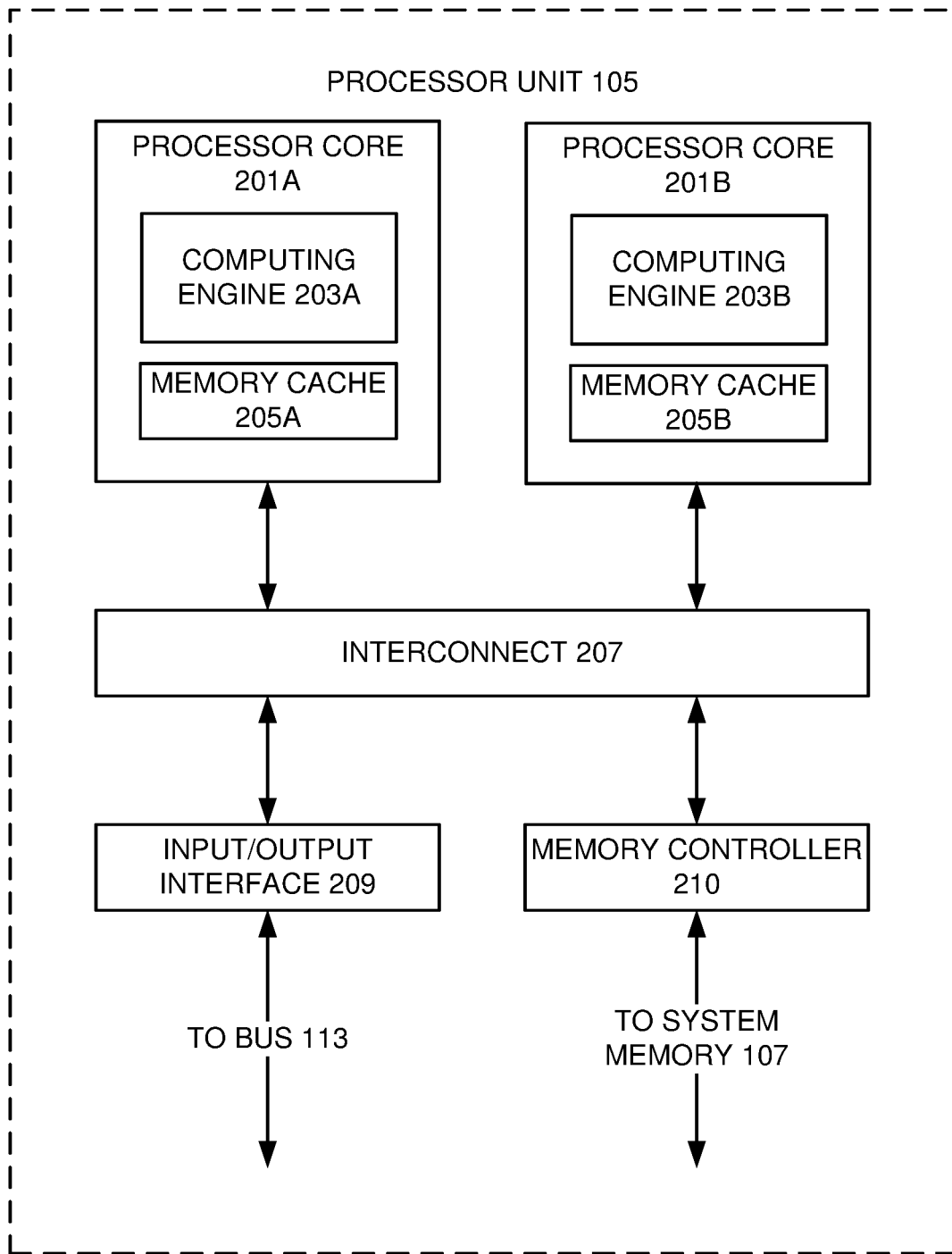

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Parasitic Extraction

Figure 3:
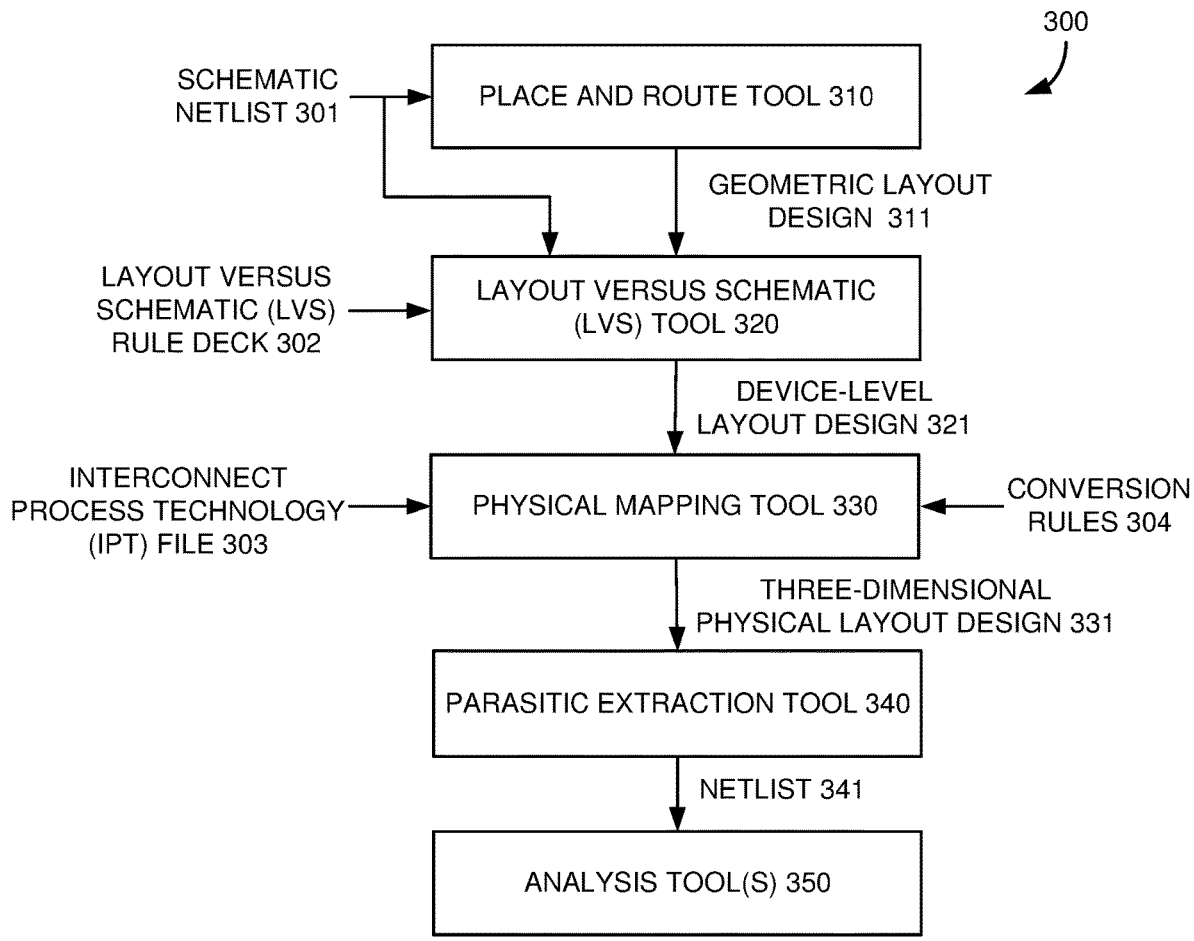
FIG. 3 illustrates an example of a design system including a physical verification design flow that may be implemented according to various embodiments of the invention.

FIG. 3 illustrates an example of a design system 300 including a physical verification design flow that may be implemented according to various embodiments of the invention. Referring to FIG. 3, the design system 300 can include a place and route tool 310 to receive a schematic netlist 301, which can describe an integrated circuit by their electronic components, such as transistors, resistors, capacitors, or the like, along with their interconnections. The schematic netlist 301 can be a compiled version of a schematic design, or a synthesized version of a circuit design modeling the integrated circuit at a register transfer level (RTL), for example, with code in a hardware description language (HDL), such as System Verilog, Very high speed integrated circuit Hardware Design Language (VHDL), or the like.

The place and route tool 310 can generate a geometric design layout 311 from the schematic netlist 301, for example, to describe the integrated circuit in terms of planar geometric shapes corresponding to patterns of metal, oxide, or semiconductor layers that make up components of the integrated circuit. In some embodiments, the geometric design layout 311 can describe or model the integrated circuit in a Library Exchange Format (LEF), a Design Exchange Format (DEF), or the like.

The design system 300 can include a layout-versus-schematic (LVS) tool 320 to generate a netlist from the geometric layout design 311 and compare the generated netlist to the schematic netlist 301 to determine whether the geometric layout design 311 accurately represents the schematic netlist 301. The LVS tool 320 can generate the netlist from the geometric layout design 311 by extracting design devices, such as transistors, diodes, capacitors, resistors, or the like, and their associated connectivity, from the geometric layout design 311 based on a layout-versus-schematic (LVS) rule deck 302. The LVS rule deck 302 can include run options, layer definitions, layer connectivity, device definitions, and device equivalence comparisons, which, for example, can be written in Standard Verification Rule Format (SVRF) or TCL Verification Format (TVF). The LVS tool 320 can utilize the contents of the LVS rule deck to identify the design devices to extract and to maintain their connectivity when generating a device-level layout design 321 from the extracted design devices. The device-level layout design 321 can be a two-dimensional physical representation of the geometric layout design 311 at a device-level of abstraction. The LVS tool 320 can convert the device-level layout design 321 into the netlist corresponding to the geometric layout design 311, which the LVS tool 320 can compare to the schematic netlist 301.

The design system 300 can include a physical mapping tool 330 to generate a three-dimensional physical layout design 331 from the device-level layout design 321 based on an Interconnect Process Technology (IPT) file 303. The IPT file 303, such as a Mentor Interconnect Process Technology (MIPT) file, can describe the physical properties of the layers in the integrated circuit, such as height of layers, materials used in the layers, a dielectric values for the layers, or the like. The physical mapping tool 330 can utilize the IPT file 303 to generate a technology file having rules for the physical layer properties described in the IPT file 303. For example, the technology file can include rules for a layer of metal 1 (M1) as having a bottom located at 0.100 and a top at 0.200, which would allow the physical mapping tool 330 to generate the three-dimensional physical layout design 331 with the layer of metal 1 as having a height of 0.100, which starts at 0.100 and ends at 0.200.

When the device-level layout design 321 generated based on the LVS rule deck 302 has the same granularity describing layers and connectivity as the IPT file 303 describes the physical properties of the layers in the integrated circuit, the physical mapping tool 330 can generate a mapping between the device-level layout design 321 and rules in the technology file, and then generate the three-dimensional physical layout design 331 by applying the rules in the technology file to the device-level layout design 321 according to the mapping.

The device-level layout design 321 generated based on the LVS rule deck 302, however, may not have the same granularity describing layers and connectivity as the rules in the technology file, for example, when the IPT file 303 includes conductors having portions manufactured at different heights, includes conductive vias coupling to or passing through different layers, or the like. The physical mapping tool 330 can modify the device-level layout design 321 to have a granularity that corresponds to the rules in the technology file based on conversion rules 304. The conversion rules 304 can describe conditions that, when present within the device-level layout design 321, can prompt the physical mapping tool 330 to modify the device-level layout design 321. For example, the conversion rules 304 can describe a condition when a first conductor is to be manufactured crossing over a second conductor on a lower layer. Since the IPT file 303 can describe physical properties associated with a manufacturing process that alters the starting height of the first conductor when it crosses over the second conductor, for example, having that section of the first conductor with a higher starting height than other sections of the first conductor, the physical mapping tool 330 can utilize the technology file to identify and sub-divide portions of the first conductor having different starting heights into multiple conductor portions. The physical mapping tool 330 also can modify the device-level layout design 311 to convert the first conductor into the sub-divided first conductor portions, while also automatically setting the connectivity for the sub-divided first conductor portions to correspond with the connectivity of the first conductor.

In another example, the conversion rules 304 can describe a condition when a conductive via is to be manufactured connecting two layers separated by one or more intermediate layers. Since the conductive via may electrically interact with intermediate layers, the conversion rules 304 can prompt the physical mapping tool 330 to sub-divide the conductor associated with the conductive via into multiple conductor portions, for example, with each of the sub-divided conductor portions in the conductive via corresponding to a different layer. The physical mapping tool 330 also can modify the device-level layout design 311 to convert the conductor corresponding to the conductive via into the sub-divided conductor portions, while also automatically setting the connectivity for the sub-divided conductor portions to correspond with the connectivity of the conductor corresponding to the conductive via.

In some embodiments, the granularity describing layers and connectivity of the modified device-level layout design can allow the physical mapping tool 330 to generate the three-dimensional physical layout design 331. The physical mapping tool 330 can generate a mapping between the modified device-level layout design and the rules in the technology file, and then generate the three-dimensional physical layout design 331 by applying the rules in the technology file to the modified device-level layout design according to the mapping. By introducing the ability to automatically modify the device-level layout design 321 generated by the LVS tool 320, the physical mapping tool 330 can align the granularity of the layers and connectivity in the device-level layout design to the granularity described in the IPT file 303. This can allow the physical mapping tool 330 the ability to map the modified device-level layout design to the rules in the technology file and generate the three-dimensional physical layout design 331 subsequently used for parasitic extraction, while also eliminating the prior trade-off between speed and ease in LVS process with accuracy in the parasitic extraction process set when the foundry generated the LVS rule deck 302 and the IPT file 303.

The design system 300 can include a parasitic extraction tool 340 to receive the three-dimensional physical design layout 331 from the physical mapping tool 330 and perform parasitic extraction on the three-dimensional physical design layout 331. For example, the parasitic extraction tool 340 can convert the three-dimensional physical design layout 331 into an electrical representation, such as a group of electrically-independent parasitic models, and generate a netlist 341 including the electrical representation of the three-dimensional physical design layout 331. In some embodiments, the netlist 341 can describe or model the electronic device in a Standard Parasitic Exchange Format (SPEF), or the like.

The parasitic extraction tool 340 can identify locations of nets within the three-dimensional physical design layout 331. Each net can describe wires or electrical paths interconnecting components between pins or ports in the three-dimensional physical design layout 331. In some embodiments, the parasitic extraction tool 340 can extract nets from the physical design layout 304 based on the locations of the nets in the physical design layout 304. The parasitic extraction tool 340 can identify parasitic values in each net extracted from the three-dimensional physical design layout 331 and generate an electrical representation of each extracted net based on the parasitic values. The parasitic values can include resistances in the nets, capacitances between the net and a ground plane having a corresponding ground voltage, coupling capacitances between proximate nets, inductances, or the like. In some embodiments, the coupling capacitance in the electrical representation can model noise or cross-talk in the net due to exchange of electromagnetic fields between multiple nets.

The parasitic extraction tool 340 can determine whether the electrical representation of a net is electrically-independent or isolated from other nets in the three-dimensional physical design layout 331, for example, based on a presence of a coupling capacitance in the electrical representation. When the electrical representation of the net is electrically-independent or isolated from other nets in the three-dimensional physical design layout 331, e.g., does not experience noise or cross-talk with an adjacent net, the parasitic extraction tool 340 can write the electrical representation of the net to the netlist 341, in some embodiments, without waiting to extract other nets from the three-dimensional physical design layout 331.

Conversely, when an electrical representation of a first net includes at least one coupling capacitance associated with a second net in the three-dimensional physical design layout 331, the parasitic extraction tool 340 can combine electrical representations of the first and second nets into a parasitic model, which can be written to the netlist 341. Further, the parasitic extraction tool 340 can identify one or more additional coupling capacitances in the subsequently extracted net, which may cause the parasitic extraction tool 340 to store electrical representations of the first and second nets, while waiting for additional nets to be extracted. Once the parasitic extraction tool 340 extracts all electrically capacitively coupled nets and combines their electrical representations into the parasitic model, the parasitic model can be written to the netlist 341 and the memory freed from storing the electrical representations of the extracted nets.

The design system 300 can include one or more analysis tools 350 to receive the netlist 341 from the parasitic extraction tool 340 and perform physical verification on the geometric design layout 311. For example, the analysis tools 350 can evaluate the electrical representation in the netlist 341 to determine whether the electronic device modeled in the geometric design layout 311 may experience electrical violations, such as voltage drops, signal delay, or signal noise.

Figure 4:
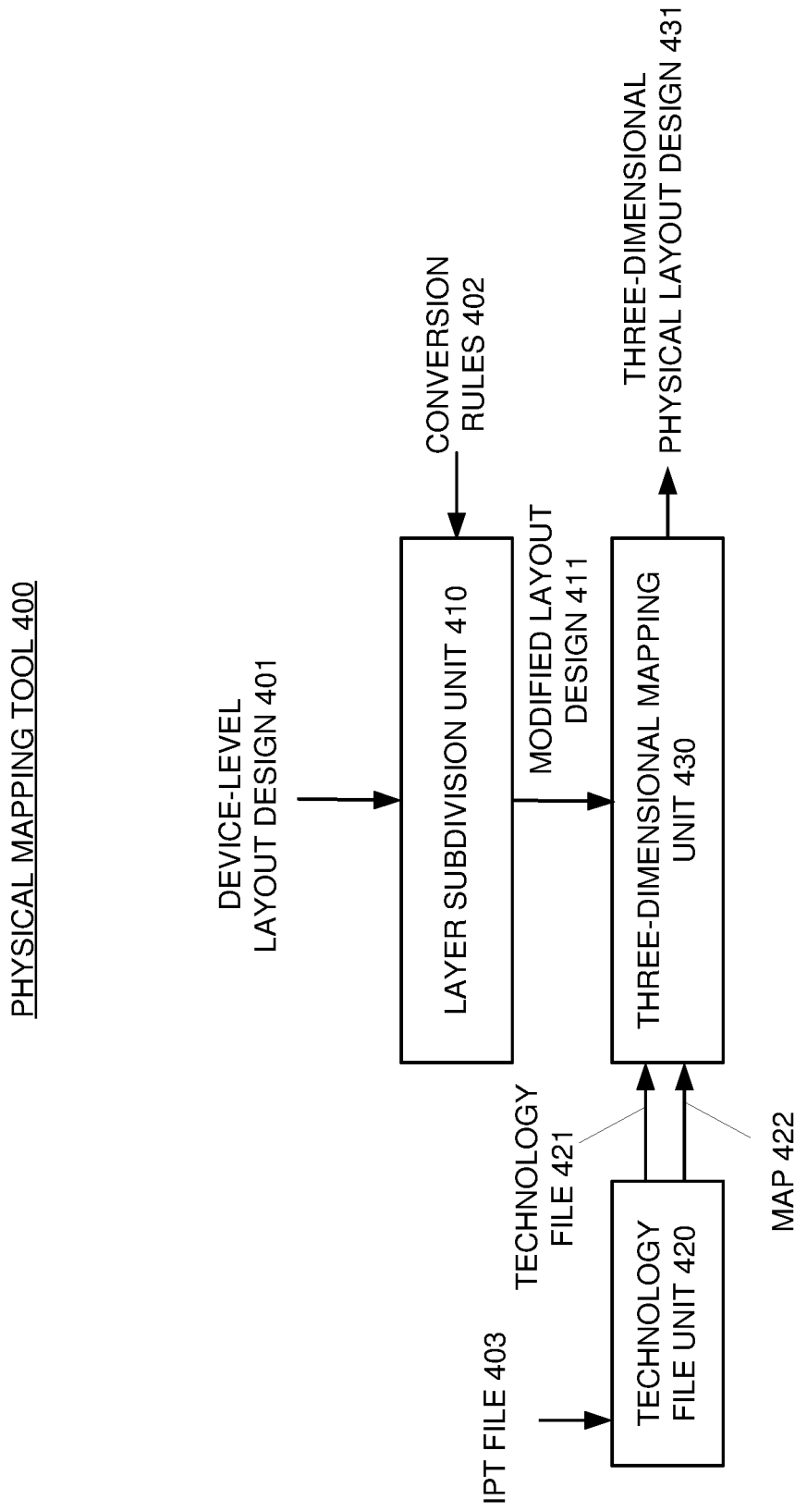
FIG. 4 illustrates an example of physical mapping tool with layer generation that may be implemented according to various embodiments.

FIG. 4 illustrates an example physical mapping tool 400 with layer subdivision that may be implemented according to various embodiments. Referring to FIG. 4, the physical mapping tool 400 can include a layer subdivision unit 410 to receive a device-level layout design 401, for example, generated from a geometric layout design during a layout-versus-schematic (LVS) process. The layer subdivision unit 410 can identify portions of the device-level layout design 401 based on a set of conversion rules 402. The set of the conversion rules 402 can describe conditions, such as a height of a conductor, location of conductors relative to each other, a presence of a conductive via, or the like, capable of being located within the device-level layout design 401. In some embodiments, the layer subdivision unit 410 can identify the portions of the device-level layout design 401 that satisfy one or more of the conditions in the set of the conversion rules 402.

The layer subdivision unit 410 can subdivide the identified portions of the device-level layout design 401 based on the conversion rules 402. For example, when the layer subdivision unit 410 identifies a metal layer in the device-level layout design 401 would be manufactured a different starting heights based on the set of the conversion rules 402, the layer subdivision unit 410, based on the set of the conversion rules 402, can subdivide the metal layer in locations corresponding to differences in the starting heights. The layer subdivision unit 410 can generate a modified layout design 411 of the integrated circuit by replacing the identified portions of the device-level layout design 401 with the subdivided portions from the device-level layout design 401.

The physical mapping tool 400 can include a technology file unit 420 to receive an Interconnect Process Technology (IPT) file 403, such as a Mentor Interconnect Process Technology (MIPT) file or the like, which can describe physical properties of layers in the integrated circuit, such as height of layers, materials used in the layers, a dielectric values for the layers, or the like. The technology file unit 420 can utilize the IPT file 403 to generate a technology file having rules for the physical layer properties described in the IPT file 403. The technology file unit 420 also can utilize the IPT file 403 to generate a map 422 of the devices, layers, conductors, or portions thereof and their connectivity within the modified layout design 411.

The physical mapping tool 400 can include a three-dimensional mapping unit 430 to generate a three-dimensional physical design 431 from the modified layout design 411. The three-dimensional mapping unit 430 can utilize the technology file 421 and the map 422 from the technology file unit 420 to convert the two-dimensional modified layout design 411 into the three-dimensional physical layout design 431. In some embodiments, the three-dimensional mapping unit 430 can utilize the map 422 to identify a portion of the modified layout design 411 and then convert the identified portion from a two-dimensional representation into a three-dimensional representation for inclusion into the three-dimensional physical layout design 431 based on the technology file 421.

Figure 5:
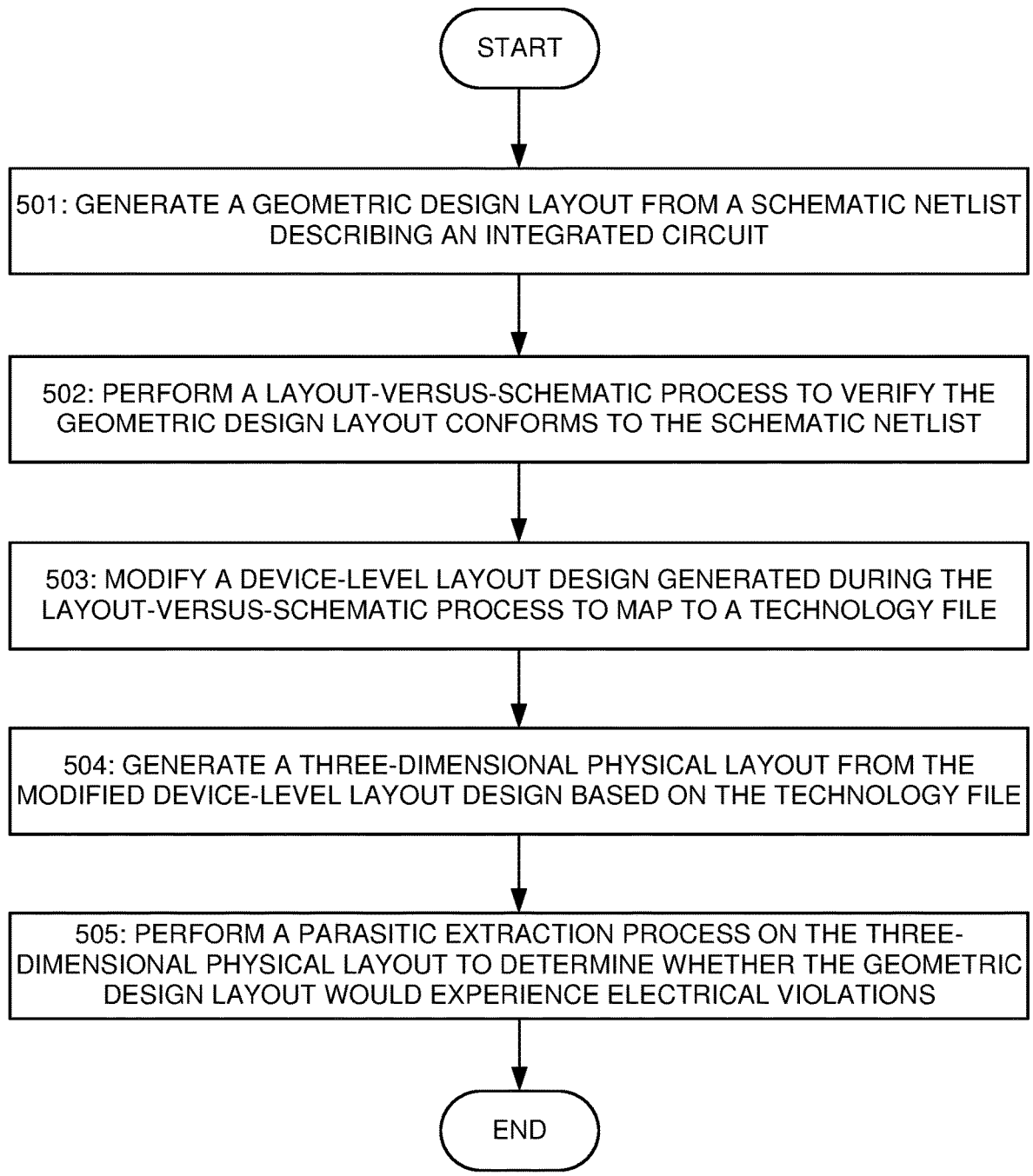
FIG. 5 illustrates a flowchart showing an example implementation of physical verification design flow that includes device-level layout design modification according to various examples.

FIG. 5 illustrates a flowchart showing an example implementation of physical verification design flow that includes device-level layout design modification according to various examples. Referring to FIG. 5, in a block 501, a computing system implementing a place-and-route process can generate a geometric design layout from a schematic netlist describing an integrated circuit. The geometric design layout can describe the integrated circuit in terms of planar geometric shapes corresponding to patterns of metal, oxide, or semiconductor layers that make up components of the integrated circuit. In some embodiments, the geometric design layout 311 can describe or model the integrated circuit in a Library Exchange Format (LEF), a Design Exchange Format (DEF), or the like.

In a block 502, a computing system can perform a layout-versus-schematic process to verify the geometric design layout conforms to the schematic netlist. The computing system can generate a netlist from the geometric layout design and compare the generated netlist to the schematic netlist to determine whether the geometric layout design accurately represents the schematic netlist. The computing system can generate the netlist from the geometric layout design by extracting design devices, such as transistors, diodes, capacitors, resistors, or the like, and their associated connectivity, from the geometric layout design based on a layout-versus-schematic (LVS) rule deck. The LVS rule deck can include run options, layer definitions, layer connectivity, device definitions, and device equivalence comparisons, which, for example, can be written in Standard Verification Rule Format (SVRF) or TCL Verification Format (TVF). The computing system can utilize the contents of the LVS rule deck to identify the design devices to extract and to maintain their connectivity when generating a device-level layout design from the extracted design devices. The device-level layout design can be a two-dimensional physical representation of the geometric layout design at a device-level of abstraction. The computing system can convert the device-level layout design into the netlist corresponding to the geometric layout design, which the computing system can compare to the schematic netlist.

In a block 503, a computing system can modify a device-level layout design generated during the layout-versus-schematic process to map to a technology file. The technology file can include a set of rules associated with the physical layer properties of layers in the integrated circuit, such as height of layers, materials used in the layers, a dielectric values for the layers, or the like, described in an Interconnect Process Technology (IPT) file. The computing system can modify the device-level layout design by sub-dividing portions of the device-level layout design, such as conductors, layers, conductive vias, or the like, based on the physical properties of the layers described in the technology file, and can automatically set the connectivity for the sub-divided portions to of the device-level layout design correspond with the connectivity of the device-level layout design. In some embodiments, the computing system can modify the device-level layout design based on conversion rules configured describe conditions that, when present within the device-level layout design, can prompt the computing system to modify the device-level layout design.

In a block 504, a computing system can generate a three-dimensional physical layout from the modified device-level layout design based on the technology file. The computing system can utilize the technology file and the map to convert the modified device-level layout design from a two-dimensional into the three-dimensional physical layout. In some embodiments, the computing system can utilize the map to identify a portion of the modified device-level layout design and then convert the identified portion from a two-dimensional representation into a three-dimensional representation for inclusion into the three-dimensional physical layout based on the technology file.

In a block 505, a computing system can perform a parasitic extraction process on the three-dimensional physical layout to determine whether the geometric design layout would experience electrical violations. The computing system can convert the three-dimensional physical layout into an electrical representation, such as a group of electrically-independent parasitic models, and generate a netlist including the electrical representation of the three-dimensional physical layout. In some embodiments, the netlist can describe or model the electronic device in a Standard Parasitic Exchange Format (SPEF), or the like. The electrical representation in the netlist can be evaluated to determine whether the integrated circuit modeled in the geometric design layout could experience electrical violations, such as voltage drops, signal delay, or signal noise, when manufactured.

Figure 6:
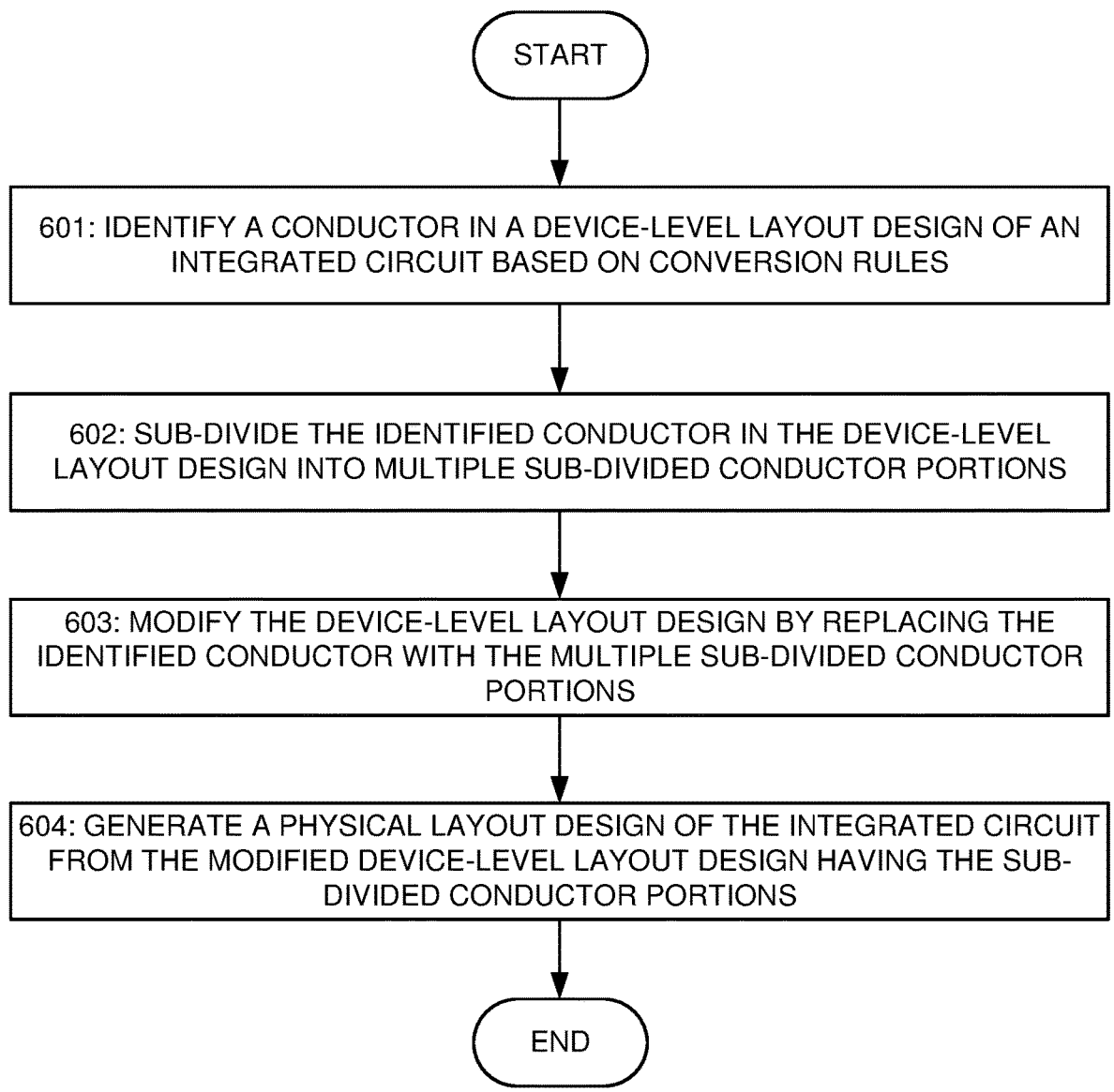
FIG. 6 illustrates a flowchart showing an example physical layout design generation through conductor subdivision of a device-level layout design according to various examples.

FIG. 6 illustrates a flowchart showing an example physical layout design generation through conductor subdivision of a device-level layout design according to various examples. Referring to FIG. 6, in a block 601, a computing system can identify a conductor in a device-level layout design of an integrated circuit based on conversion rules and, in a block 602, the computing system can sub-divide the identified conductor in the device-level layout design into multiple sub-divided conductor portions based on the conversion rules. In some embodiments, the device-level layout design can be generated from a geometric layout design during a layout-versus-schematic (LVS) process. The conversion rules can describe conditions, such as a height of a conductor, location of conductors relative to each other, a presence of a conductive via, or the like, capable of being included within the device-level layout design. In some embodiments, the computing system can identify the portions of the device-level layout design that satisfy one or more of the conditions in the conversion rules, and then utilize the conversion rules to determine how to sub-divided the identified portions of the device-level layout design.

In a block 603, the computing system can modify the device-level layout design by replacing the identified conductor with the multiple sub-divided conductor portions. The computing system also can automatically set the connectivity of the subdivided portions in the modified device-level layout design of the integrated circuit.

In a block 604, the computing system can generate a physical layout design of the integrated circuit from the modified device-level layout design having the sub-divided conductor portions based on a mapping between the modified device-level layout design and a technology file defining physical properties layers in the integrated circuit. In some embodiments, the computing system can utilize the mapping to identify a portion of the modified device-level layout design and then convert the identified portion from a two-dimensional representation into a three-dimensional representation for inclusion into the three-dimensional physical layout design based on the technology file.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
    sub-dividing, by a computing system, at least one conductor in a device-level layout design of an integrated circuit into multiple sub-divided conductor portions based on a technology file defining physical properties for layers in the integrated circuit at a different level of granularity than in the device-level layout design, wherein the device-level layout design is generated from a geometric layout design of the integrated circuit and corresponds to a physical representation of the geometric layout design of the integrated circuit at a device-level of abstraction;
    modifying, by the computing system, the device-level layout design to align with the granularity of the physical properties for layers in the integrated circuit defined by the technology file by replacing the at least one conductor in the device-level layout design with the sub-divided conductor portions;
    generating, by the computing system, a mapping between the modified device-level layout design and rules in the technology file defining the physical properties for the layers in the integrated circuit;
    generating, by the computing system, a physical layout design of the integrated circuit from the modified device-level layout design having the sub-divided conductor portions by applying the rules in the technology file to different portions of the modified device-level layout design according to the mapping; and extracting, by the computing system, electrical representations of nets corresponding to the conductors in the physical layout design to form a netlist for the physical layout design.

2. The method of claim 1, wherein sub-dividing the conductor in the device-level layout design of the integrated circuit is performed according to conversion rules corresponding to the physical properties of layers for the integrated circuit described in the technology file.

3. The method of claim 1, wherein sub-dividing the conductor in the device-level layout design of the integrated circuit automatically sets connectivity for the sub-divided conductor portions based on the connectivity of the conductor prior to the sub-dividing.

4. The method of claim 1, wherein the device-level layout design for the integrated circuit was generated based on a layout-to-schematic (LVS) rule deck from a foundry to manufacture the integrated circuit.

5. The method of claim 4, wherein the technology file defines the physical properties of the layers in the integrated circuit in a greater level of detail than the LVS rule deck defines the layers and the layer connectivity for the integrated circuit.

6. The method of claim 1, wherein the conductor in the device-level layout design of the integrated circuit corresponds to a conductor layer in the integrated circuit or to a via coupling a plurality of the layers in the integrated circuit.

7. The method of claim 1, wherein generating the physical layout design for the integrated circuit further comprises converting the modified device-level layout design describing the integrated circuit in two-dimensions into the physical layout design describing the integrated circuit in three-dimensions.

8. An apparatus comprising at least one memory device storing instructions configured to cause one or more processing devices to perform operations comprising:
sub-dividing at least one conductor in a device-level layout design of an integrated circuit into multiple sub-divided conductor portions based on a technology file defining physical properties for layers in the integrated circuit at a different level of granularity than in the device-level layout design, wherein the device-level layout design is generated from a geometric layout design of the integrated circuit and corresponds to a physical representation of the geometric layout design of the integrated circuit at a device-level of abstraction;
modifying the device-level layout design to align with the granularity of the physical properties for layers in the integrated circuit defined by the technology file by replacing the at least one conductor in the device-level layout design with the sub-divided conductor portions;
generating a mapping between the modified device-level layout design and rules in the technology file defining physical properties for layers in the integrated circuit;
generating a physical layout design of the integrated circuit from the modified device-level layout design having the sub-divided conductor portions by applying the rules in the technology file to different portions of the modified device-level layout design according to the mapping; and
extracting electrical representations of nets corresponding to the conductors in the physical layout design to form a netlist for the physical layout design.

9. The apparatus of claim 8, wherein sub-dividing the conductor in the device-level layout design of the integrated circuit is performed according to conversion rules corresponding to the physical properties of layers for the integrated circuit described in the technology file.

10. The apparatus of claim 8, wherein sub-dividing the conductor in the device-level layout design of the integrated circuit automatically sets connectivity for the sub-divided conductor portions based on the connectivity of the conductor prior to the sub-dividing.

11. The apparatus of claim 8, wherein the device-level layout design for the integrated circuit was generated based on a layout-to-schematic (LVS) rule deck from a foundry to manufacture the integrated circuit.

12. The apparatus of claim 11, wherein the technology file defines the physical properties of the layers in the integrated circuit in a greater level of detail than the LVS rule deck defines the layers and the layer connectivity for the integrated circuit.

13. The apparatus of claim 8, wherein the conductor in the device-level layout design of the integrated circuit corresponds to a conductor layer in the integrated circuit or to a via coupling a plurality of the layers in the integrated circuit.

14. The apparatus of claim 8, wherein generating the physical layout design for the integrated circuit further comprises converting the modified device-level layout design describing the integrated circuit in two-dimensions into the physical layout design describing the integrated circuit in three-dimensions.

15. A system comprising:
a memory device configured to store machine-readable instructions; and
a computing system including one or more processing devices, in response to executing the machine-readable instructions, configured to:
sub-divide at least one conductor in a device-level layout design of an integrated circuit into multiple sub-divided conductor portions based on a technology file defining physical properties for layers in the integrated circuit at a different level of granularity than in the device-level layout design, wherein the device-level layout design is generated from a geometric layout design of the integrated circuit and corresponds to a physical representation of the geometric layout design of the integrated circuit at a device-level of abstraction;
modify the device-level layout design to align with the granularity of the physical properties for layers in the integrated circuit defined by the technology file by replacing the at least one conductor in the device-level layout design with the sub-divided conductor portions;
generate a mapping between the modified device-level layout design and rules in the technology file defining physical properties for layers in the integrated circuit;
generate a physical layout design of the integrated circuit from the modified device-level layout design having the sub-divided conductor portions by applying the rules in the technology file to different portions of the modified device-level layout design according to the mapping; and
extract electrical representations of nets corresponding to the conductors in the physical layout design to form a netlist for the physical layout design.

16. The system of claim 15, wherein sub-dividing the conductor in the device-level layout design of the integrated circuit is performed according to conversion rules corresponding to the physical properties of layers for the integrated circuit described in the technology file.

17. The system of claim 15, wherein sub-dividing the conductor in the device-level layout design of the integrated circuit automatically sets connectivity for the sub-divided conductor portions based on the connectivity of the conductor prior to the sub-dividing.

18. The system of claim 15, wherein the device-level layout design for the integrated circuit was generated based on a layout-to-schematic (LVS) rule deck from a foundry to manufacture the integrated circuit.

19. The system of claim 18, wherein the technology file defines the physical properties of the layers in the integrated circuit in a greater level of detail than the LVS rule deck defines the layers and the layer connectivity for the integrated circuit.

20. The system of claim 15, wherein the conductor in the device-level layout design of the integrated circuit corresponds to a conductor layer in the integrated circuit or to a via coupling a plurality of the layers in the integrated circuit.

\* \* \* \* \*